United States Patent [19]

Crissman

[11] Patent Number: 5,273,390

[45] Date of Patent: Dec. 28, 1993

[54] TRUCK BED INSERT HAVING POWER UNLOADING BLADE

[76] Inventor: Donald R. Crissman, 1016 Bear Creek Rd., Cabot, Pa. 16023

[21] Appl. No.: 959,783

[22] Filed: Oct. 13, 1992

[51] Int. Cl.⁵ .............................................. B60P 1/00
[52] U.S. Cl. ...................................... 414/513; 414/19; 414/509; 414/492; 296/39.2
[58] Field of Search ............... 414/509, 510, 511, 512, 414/513, 514, 515, 516, 517, 518, 525.6, 18, 19, 492, 493; 100/214, 218; 298/1 B; 296/39.1, 39.2

[56] References Cited

U.S. PATENT DOCUMENTS

| | | | |
|---|---|---|---|
| 671,599 | 4/1901 | Koffler | 414/509 |
| 2,495,358 | 1/1950 | Wengert | 414/515 |
| 2,760,571 | 8/1956 | Dayton | 414/19 X |
| 2,788,136 | 4/1951 | Hebert et al. | 414/510 X |
| 2,911,119 | 11/1959 | Kuhnau | 414/517 X |

FOREIGN PATENT DOCUMENTS

| | | | |
|---|---|---|---|
| 124393 | 5/1947 | Australia | 414/514 |
| 3309647 | 4/1985 | Fed. Rep. of Germany | 414/511 |
| 190554 | 7/1989 | Japan | 414/509 |

*Primary Examiner*—Frank E. Werner
*Attorney, Agent, or Firm*—James Irwin

[57] ABSTRACT

A truck bed insert having a powered unloading blade, the insert adapted to be carried on a truck bed, the insert comprising a floor, a tunnel member, upwardly extending sides joined to said floor sides, the front end comprising a blade upwardly extending from said floor and disposed between said upwardly extending sides. A worm screw drive shaft is mounted in said tunnel member. Power is provided for turning said worm drive. A blade stabilizer is provided having a threaded section and having said worm drive shaft threaded into said threaded section adapted for moving the blade backwardly towards said discharge end when said worm drive shaft is turned by said power means

7 Claims, 2 Drawing Sheets

TRUCK BED INSERT HAVING POWER UNLOADING BLADE

INTRODUCTION

This invention relates to a truck bed and more particularly it relates to an insert for a truck bed having a powered unloading blade.

In the past trucks have been equipped with hydraulic means for lifting the bed of the truck at the front for removing materials contained therein. Normally this approach has been use in larger trucks where, of course, the cargo load is much greater and would entail great effort to unload manually.

Various inserts have been suggested for use with truck beds but most of these resort to a hydraulic means for tipping the insert for purposes of unloading cargo. This greatly adds to the complexity of the system and makes it extremely difficult to load or unload the bed insert when it is not needed.

Many unloading devices are disclosed in the prior art. Such devices are shown for example in U.S. Pat. Nos. 766,866, 2,298,982, 2,495,358, 2,463,643, 2,515,334, 2,640,613, 3,656,638, 4,002,272, 4,685,856 and 2,899,090, and in British patent 1,071,890 and German patent 25 36 391. However, the devices in these patents rely on cables or chains for activating the ejector blade. When cables are used, the ejector blade requires braces in order to keep it in a vertical position. One problem with the used of cables is that they do not provide any stabilization to the blade. The use of braces required a certain amount of space. This can have the effect of cutting down on the payload particularly when the blade is being used on an insert for a truck bed.

Thus, it will be seen that there is a great need for a truck bed insert which has a power blade for unloading cargo and which can be use without interfering with the payload. The present invention provides such a truck bed insert which is easily loaded on to a pick-up truck, for example, for which may be used as a replacement truck bed or trailer bed and which provides great ease of operation.

SUMMARY OF THE INVENTION

An object of the present invention is to provide a truck bed insert suitable for carrying in the bed of a truck.

Another object of the present invention is to provide a truck bed insert which has a powered ejector blade for removing cargo.

It is another object of the present invention to provide a truck bed insert having an ejector blade which is powered by a worm gear.

And yet another object of the present invention is to provide an powered ejector blade for a truck bed wherein the blade is stabilized by the worm gear.

These and other objects of the invention will become apparent from a reading of the specification and claims, and an inspection of the drawings appended hereto.

In accordance with these objects there is provided a truck bed insert adapted to be carried on or used as a truck bed. The truck bed insert comprises a floor having two sides, a front end and a discharge end. The insert may have a slotted opening extending from the front end to the discharge end. In one embodiment the slotted opening divides the floor into two sections. A tunnel member is located or attached under the floor and joins the two sections. Alternately, tunnel member may be attached to the upwardly extending sides. The upwardly extending sides are joined to the floor sides. The front end comprises a blade that extends upwardly from the floor and is disposed between said upwardly extending sides. A worm screw drive shaft is mounted to rotate in the tunnel member and extends from the front end to the discharge end. A power means is provided for turning the worm drive. A blade stabilizer is provided having a threaded section and having the worm drive shaft threaded into the threaded section under the floor. The blade stabilizer extends through the slotted opening and preferably has an upwardly extending portion fastened to the blade. The blade is adapted or designed to be moved backwardly towards the discharge end when the worm drive shaft is turned by the power means. The worm screw drive shaft and the blade stablizer cooperates to stabilize the blade when it is forcing cargo out the discharge end. A removable cover may be provided to cover or uncover the slotted opening as the blade is moved towards the discharge end or is moved towards the front of the bed insert after the cargo has been discharged.

DETAILED DESCRIPTION OF THE PREFERRED EMBODIMENTS

Figure 1:
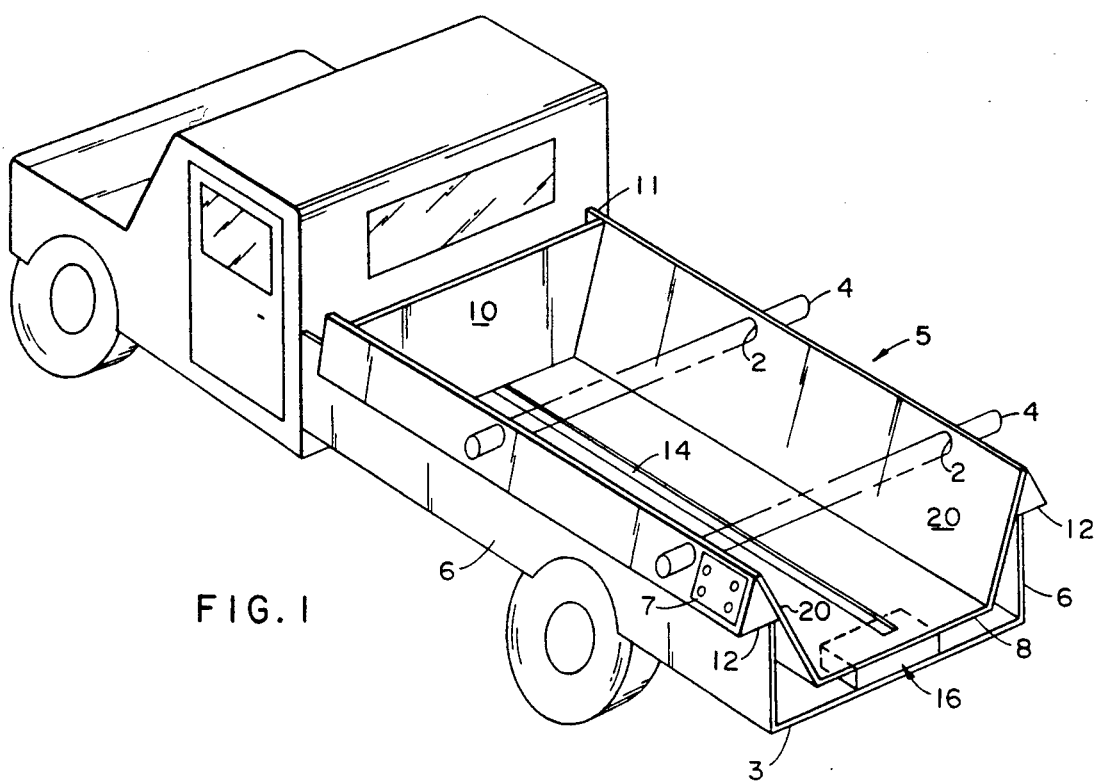
FIG. 1 is a perspective view of a truck bed insert position on a truck bed in accordance with the invention.

FIG. 1 shows a schematic of a truck having a removable truck bed insert 5 positioned in a truck bed 3 in accordance with the present invention. The truck bed insert can be fastened to the truck bed by any convenient means (not shown) such as bolts or clamps that permit ease of removal when the truck bed insert is not needed. Further, carrier bars 4 may be inserted through openings 2 and jack stands attached thereto (not shown) for purposes of unloading the truck bed insert and permitting driving of the truck out from under the truck bed insert. A control panel 7 can be provided to control the movement of blade 10 to discharge cargo from the truck bed insert. As shown in FIG. 1, truck bed insert 5 can rest on the truck bed floor and upwardly extending sides 20 can have extensions 12 which rest on the top of sides of the original truck bed. This also provides support for sides 20 of insert 5.

By truck bed insert as used herein is meant to include a truck bed insert, a replacement bed or a bed that is used as a trailer and may be towed behind a vehicle.

Truck bed insert 5 is comprised of a floor 8 that has two sides 20 as noted. Further, the truck bed insert has a front end 11 and a discharge end. In a preferred embodiment, floor 8 has a slotted opening 14 which extends from front end 11 to the discharge end. A tunnel member 16 is provided under the slotted opening in the floor member and is joined to the floor on either side of the slotted opening. The tunnel member may be rectangular shaped and ends 17 are provided in the tunnel member (see FIGS. 6 and 7). A plate 19 may be provided on the end of the tunnel member to protect gears contained therein from cargo being discharged.

Truck bed insert 5 has upwardly extending sides 20 which are joined to the sides of floor 8. Sides 20 extend from the front end to the discharge end. Sides 20 extend generally upwardly and can extend above the sides 6 of truck bed 3. In a preferred embodiment the sides 20 of the insert extend above and over the sides of truck bed 3 as shown by extensions 12. Further, sides 20 may slope generally outwardly, FIG. 2, as they extend upwardly from floor 8. This has the advantage of providing greater cargo space particularly if the floor is fabricated narrower than the truck bed to avoid interference with wheel wells that normally protrude into the bed of small trucks.

Figure 3:
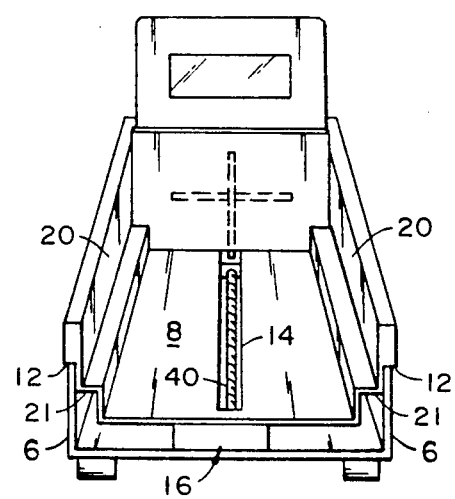
FIG. 3 is another rear view of a truck bed insert showing a different bed configuration.

In another embodiment upwardly extending sides 20 may be provided in a stepped arrangement as shown in FIG. 3 In FIG. 3 step portion 21 is provided to avoid the wheel wells in the truck bed and to maximize the cargo space. Sides 20 may extend upwardly beyond the height of the sides of the original truck bed and may extend over and rest on the sides of the original truck bed as shown at 12 of FIG. 3.

Figure 2:
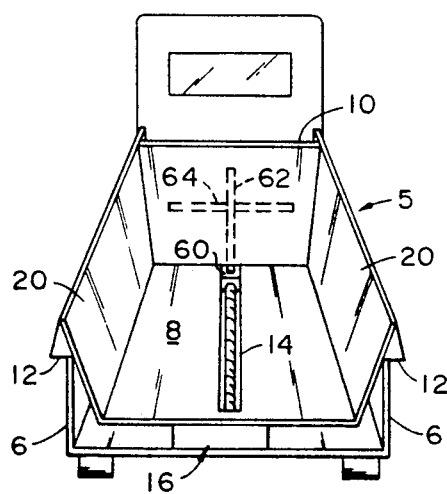
FIG. 2 is a rear view of the truck bed insert showing slanted sides permitting the insert to be positioned between the wheel wells of a pick-truck.

Blade 10 is disposed between sides 20 and can be shaped to fit closely between sides 20 as shown in FIGS. 1 and 2 or to fit the stepped sides shown in FIG. 3. That is, blade 10 is shaped to fit closely with sides 20 and floor 8 so as to enable effective removal of cargo.

Figure 4:
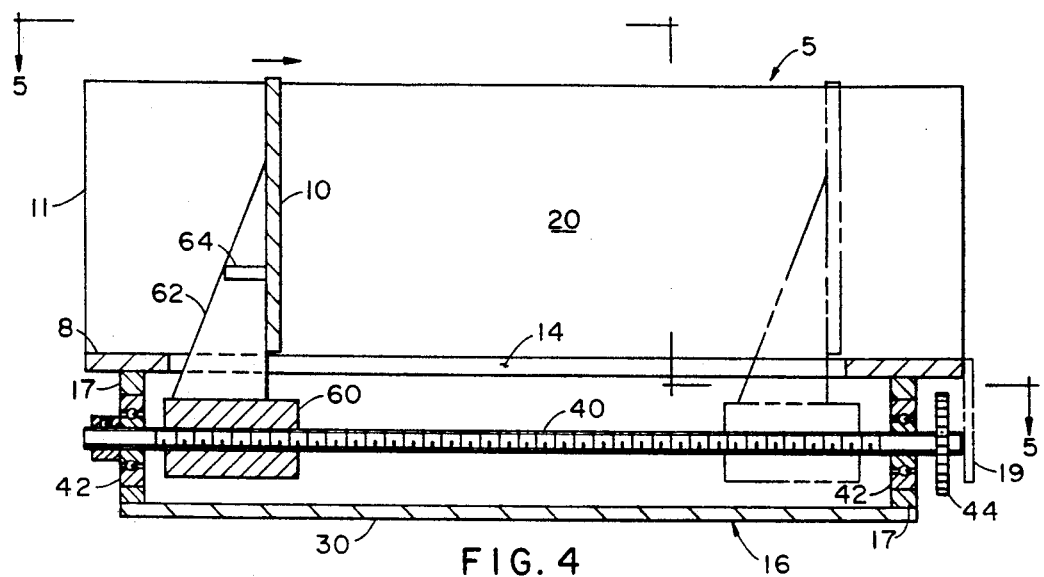
FIG. 4 is a cross-sectional view showing a worm drive and mounting means for a movable blade.
Figure 5:
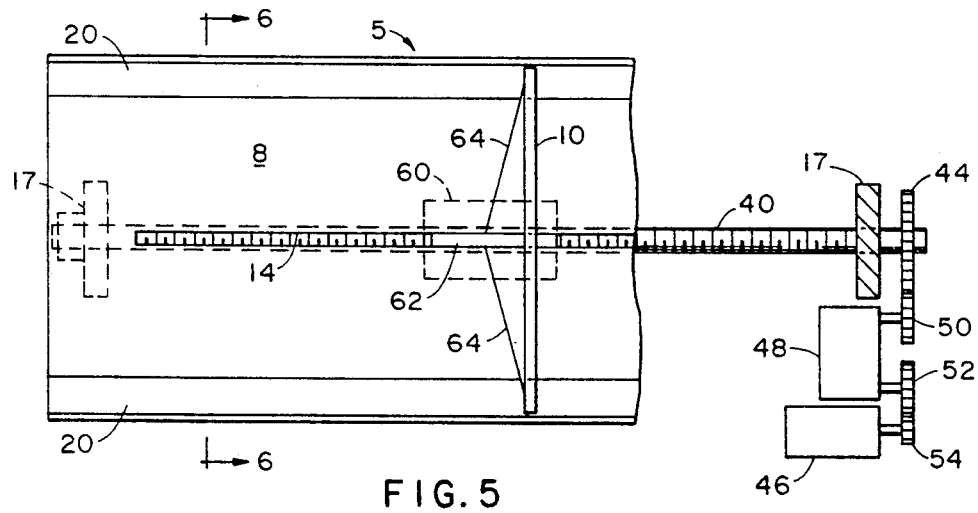
FIG. 5 is a view similar to FIG. 4 except the blade has been moved towards the discharge end.

As will be seen in FIGS. 4 and 5 there is shown a cross-sectional view of tunnel 16, sectioned along slotted-opening 14. Tunnel 16 has a bottom plate 30 and ends 17. Mounted in tunnel 16 is a worm screw drive shaft positioned in bearings 42. Fastened to an end of drive shaft 40 extending through bearing 42 is a gear 44. Gear 44 can be driven by an electric motor 46, for example, through gear box 48 and gears 50, 52 and 54.

Figure 6:
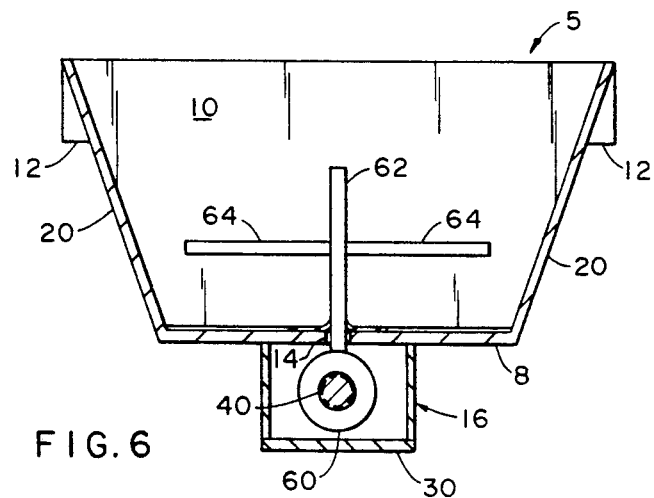
FIG. 6 is a view showing the blade stabilizer attached to the blade.

A blade stabilizing member or section 60 is threaded on to worm screw drive shaft 40. Securely fastened to a generally vertical blade stabilizing member 60 is a bracket 62. Also, securely fastened to member 60 and to bracket 62 is blade 10 (FIG. 6). At least one horizontal bracket 64 may be attached to blade 10 and vertical bracket 62 or to stabilizing member 60 to ensure that either side of blade 10 is driven forward to eject cargo. Similarly, vertical bracket 62 ensures that the top of blade 10 does not tilt backwards under load. Thus, it will be seen that vertical bracket 62 extends through slotted opening 14 and carries blade 10 just above floor 8. Vertical bracket 62 moves along slotted opening 14 as worm screw drive shaft 40 is turned.

It will be appreciated that worm screw drive shaft 40 should be sufficiently strong and member 60 should be sufficiently long to prevent bending of shaft 40 or warping of blade 10 under load.

In operation, for purposes of discharging cargo such as gravel or sand, for example, from truck bed insert, motor 46 is energized and gears 54, 52, 50 and 44 are turned thereby requiring worm screw shaft 40 to turn in bearings 42. Because blade stabilizing member 60 is threaded into shaft 40, member 40 travels along shaft 40 carrying blade 10 which pushes cargo towards the discharge end. Bracket 62 traverses slotted opening 14. A flexible covering can be provided over slotted opening 14 which permits bracket 62 to traverse slotted opening 14 and yet the flexible covering protects worm screw shaft 40. The flexible material can be fabricated from rubber or plastic type material or it can be fabricated from thin gauge metal stripe. The rubber type material may be simply pushed aside by the vertical bracket or the metal stripe may be in the form of a belt which moves with blade 10.

While the invention has been described using a tunnel member and worm screw shaft under the floor, it will be appreciated that the tunnel may be attached to the top surface of the floor. Or tunnel members and screw mechanisms may be attached to both upwardly extending sides and blade stabilizers extending therefrom fastened to the blade. Two worm screw mechanisms may be operated simultaneously to move the blade backwardly in the bed to eject or remove cargo.

Truck bed insert 10 can be fabricated out of any suitable material preferably light weight material such as aluminum or plastic so as to permit higher payloads.

While the invention has been described in terms of preferred embodiments, other embodiments are intended to be encompassed with in the spirit of the invention.

What is claimed is:

1. A truck bed insert adapted to be used in a truck bed having a bottom surface and walls extending upwardly from the bottom surface to support said insert, the insert comprising:
   (a) a floor having an underside and having two sides, a front end and a discharge end
   (b) upwardly extending sides joined to said floor sides;
   (c) a blade comprising said front end, the blade upwardly extending from said floor and disposed between said upwardly extending sides;
   (d) at least one tunnel member defined by a bottom, tunnel sides and a top, said tunnel member attached to the underside of one of said floor and said upwardly extending sides, the tunnel member extending from the front end to said discharge end and having a slotted opening into said bed, the slotted opening extending from the front end to said discharge end;
   (e) a worm screw drive shaft mounted in said tunnel member and extending from the front end to the discharge end;
   (f) power means for turning said worm drive; and
   (g) a blade stabilizer having a threaded section positioned in said tunnel and having said worm drive shaft threaded into said threaded section, said blade stabilizer having a portion thereof extending through said slotted opening and fastened to said blade in said bed, said blade adapted to be moved backwardly towards said discharge end when said worm drive shaft is turned by said power means.

2. The truck bed insert in accordance with claim 1 wherein said threaded section is sufficiently long to prevent said blade from becoming misaligned.

3. The truck bed insert in accordance with claim 1 wherein said floor divided into two sections.

4. The truck bed insert in accordance with claim 3 wherein said tunnel member is located under said floor and joins said two sides.

5. The truck bed insert in accordance with claim 4 wherein said stablizer has a portion thereof upwardly extending through said slotted opening.

6. The truck bed insert in accordance with claim 3 wherein a removable covering means is provided for covering said slotted opening as said blade is moved towards said discharge end.

7. A truck bed insert adapted to be used in a truck bed having a bottom surface and walls extending upwardly from the bottom surface to support said insert, the insert comprising:
(a) a floor having an underside and having two sides, a front end and a discharge end and a slotted opening extending from the front end to said discharge end dividing said floor into two sections
(b) a tunnel member defined by a bottom, tunnel sides and a top, said tunnel member located under said floor, said top attached to said floor and joining said two sections;
(c) upwardly extending sides joined to said floor sides;
(d) a blade comprising said front end, the blade upwardly extending from said floor and disposed between said upwardly extending sides;
(e) a worm screw drive shaft mounted in said tunnel member and extending from the front end to the discharge end;
(f) power means for turning said worm drive;
(g) a blade stabilizer having a threaded section and having said worm drive shaft threaded into said threaded section under said floor, said blade stabilizer extending upwardly through said slotted opening and having an upwardly extending portion fastened to said blade, said blade adapted to be moved backwardly towards said discharge end when said worm drive shaft is turned by said power means.

* * * * *